US008495278B2

(12) United States Patent
Iwashiro et al.

(10) Patent No.: US 8,495,278 B2
(45) Date of Patent: Jul. 23, 2013

(54) CONTROLLER WHICH CONTROLS OPERATION OF NONVOLATILE SEMICONDUCTOR MEMORY AND SEMICONDUCTOR MEMORY DEVICE INCLUDING NONVOLATILE SEMICONDUCTOR MEMORY AND CONTROLLER THEREFORE

(75) Inventors: Tarou Iwashiro, Yokohama (JP);
Takahide Nishiyama, Yokohama (JP);
Seiichi Tomita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 876 days.

(21) Appl. No.: 12/554,144

(22) Filed: Sep. 4, 2009

(65) Prior Publication Data

US 2010/0241791 A1    Sep. 23, 2010

(30) Foreign Application Priority Data

Mar. 23, 2009 (JP) ................. 2009-070582

(51) Int. Cl.
*G06F 12/02* (2006.01)
(52) U.S. Cl.
USPC .................. 711/103; 711/E12.008
(58) Field of Classification Search
USPC .......................................... 711/103
See application file for complete search history.

(56) References Cited

U.S. PATENT DOCUMENTS

| 6,434,691 B2 * | 8/2002 | Murakami et al. ............ 712/205 |
| 2005/0195655 A1 * | 9/2005 | Piersimoni et al. ...... 365/185.18 |
| 2008/0144376 A1 * | 6/2008 | Lee .......................... 365/185.05 |

FOREIGN PATENT DOCUMENTS

| JP | 10-79197 | 3/1998 |
| JP | 11-144476 | 5/1999 |
| JP | 2000-40386 | 2/2000 |
| JP | 2003-141888 | 5/2003 |
| JP | 2003-242785 | 8/2003 |
| JP | 2004-348790 | 12/2004 |
| WO | WO 96/24138 | 8/1996 |

OTHER PUBLICATIONS

Office Action mailed Oct. 23, 2012, in Japanese Patent Application No. 2009-070582, filed Mar. 23, 2009 (with English-language translation).

* cited by examiner

*Primary Examiner* — Kenneth Lo
(74) *Attorney, Agent, or Firm* — Oblon, Spivak, McClelland, Maier & Neustadt, L.L.P.

(57) ABSTRACT

A controller includes an instruction table memory, a program counter, a first decoder, and a first executing unit. The instruction table memory stores an instruction code obtained by coding a sequence to access a nonvolatile semiconductor memory. A read address in the instruction table memory is set to the program counter. The first decoder decodes the instruction code read from the instruction table memory to output a first decode signal. The first executing unit executes access to the nonvolatile semiconductor memory on the basis of the first decode signal output from the first decoder.

10 Claims, 7 Drawing Sheets

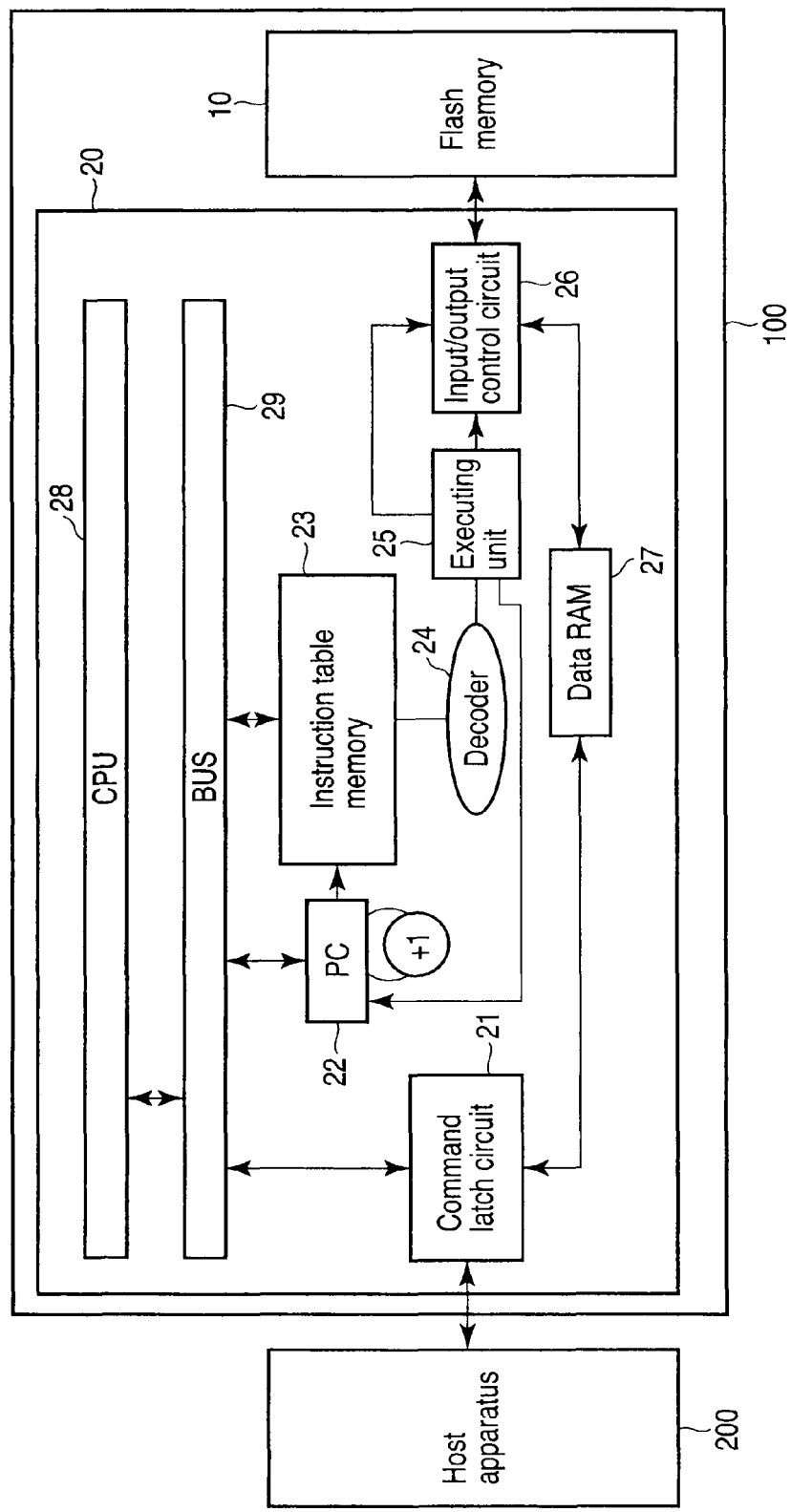
F I G. 1

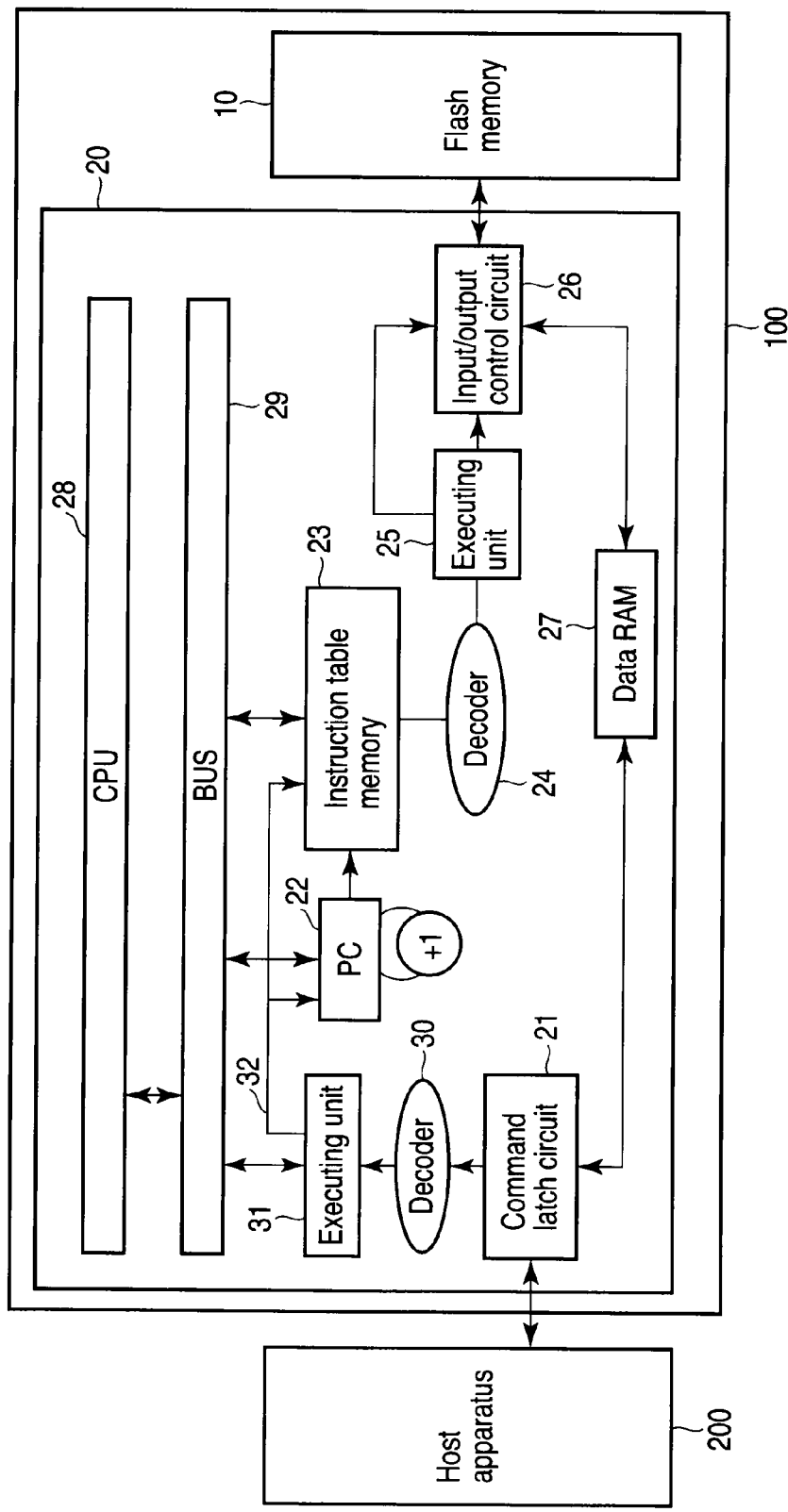
F I G. 3

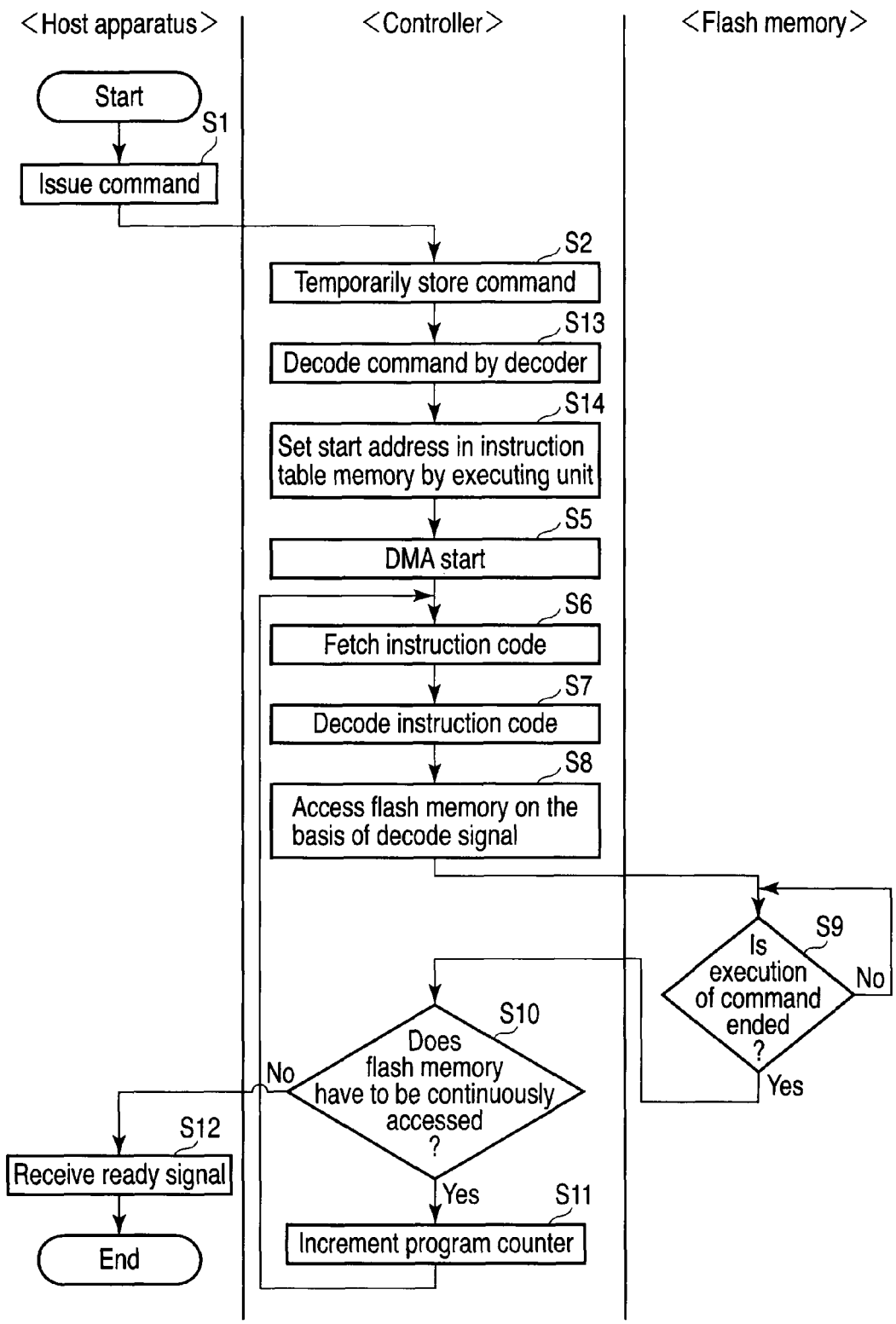
F I G. 4

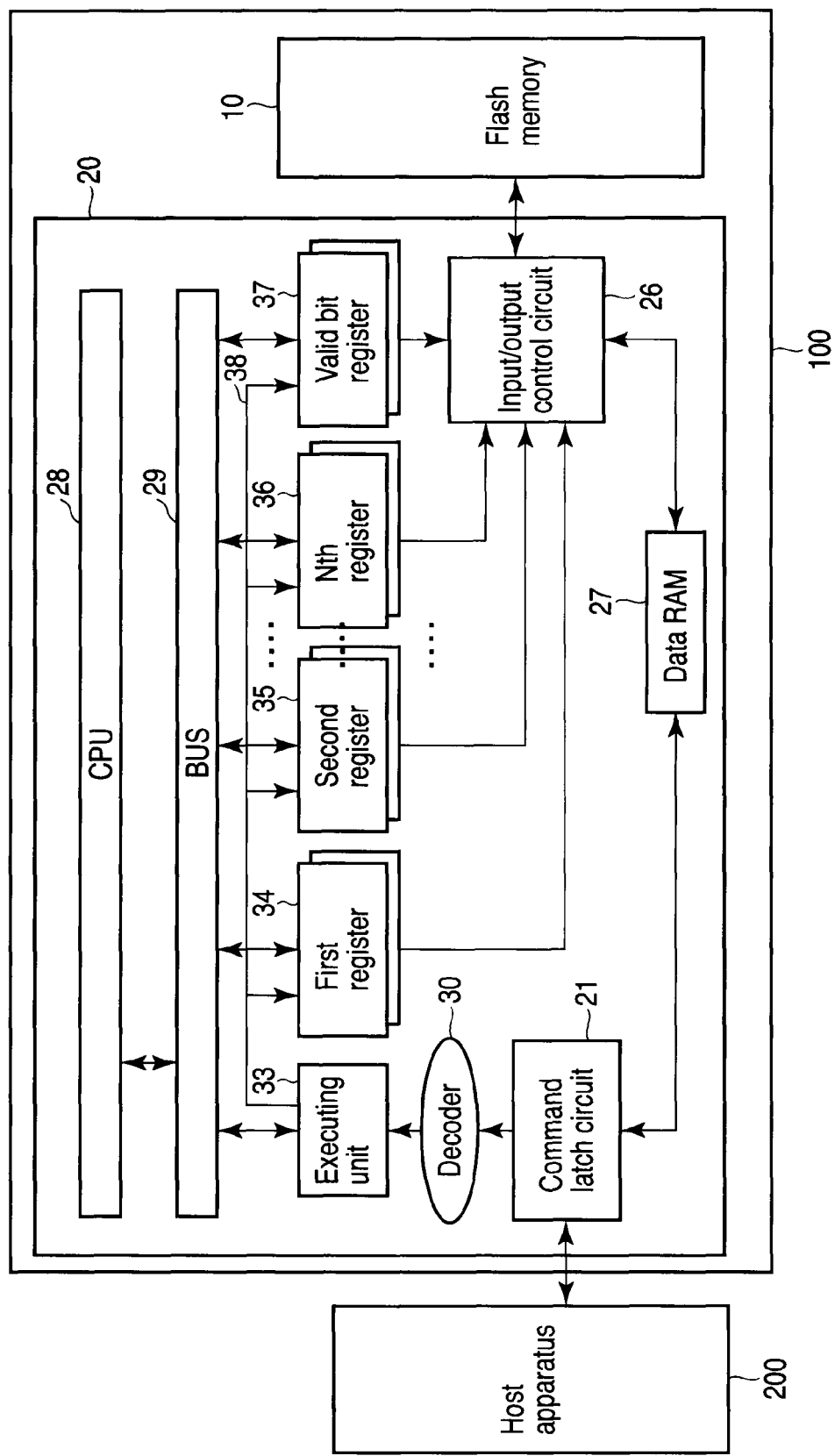
F I G. 5

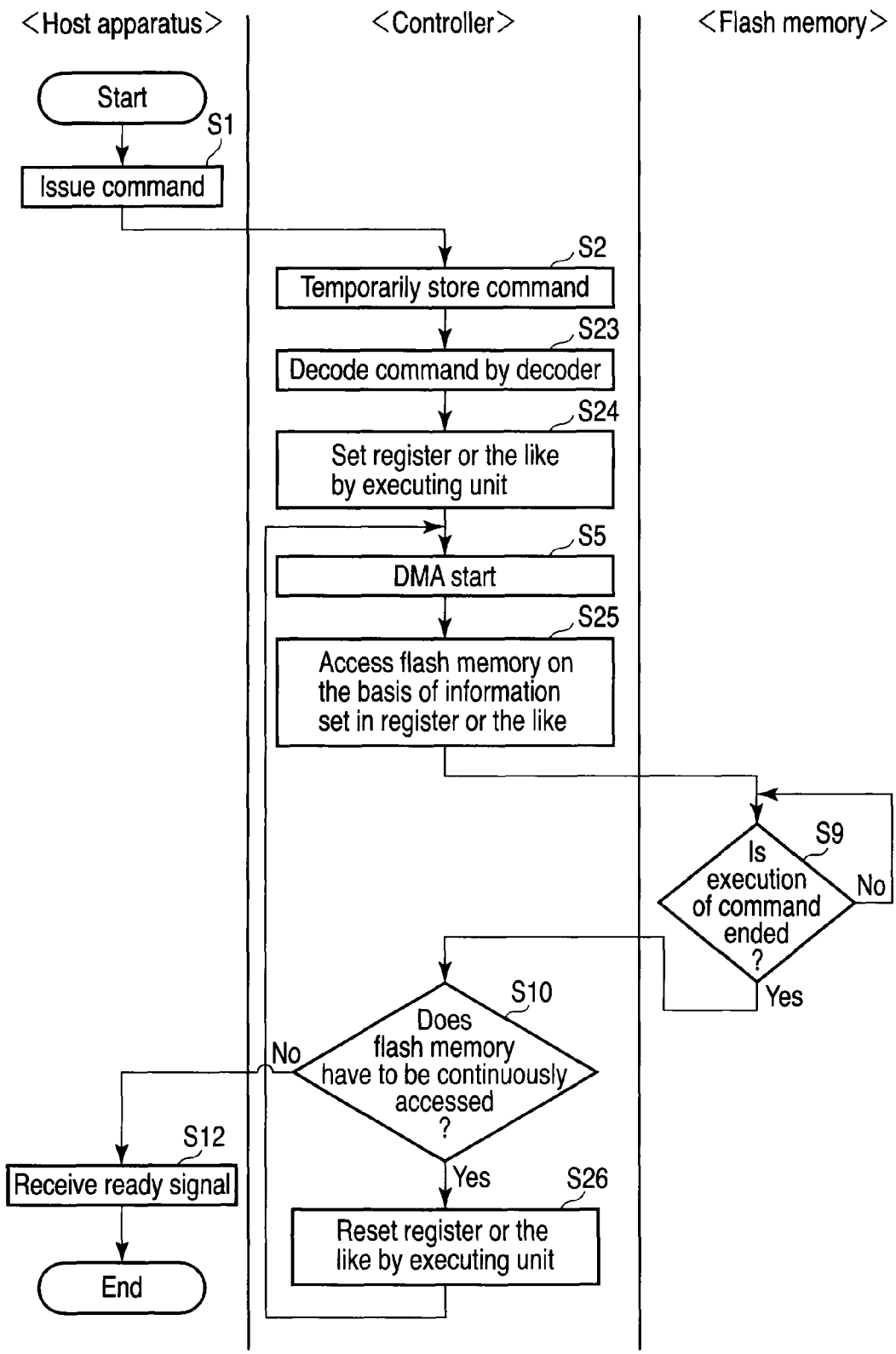
F I G. 6

FIG. 7A

| Host access time | HW sequencer process time(1) | CPU access time | HW sequencer process time(2) | Flash memory access time(1) | Flash memory access time(2) |

FIG. 7B

| Host access time | HW sequencer process time(1) | Flash memory access time(1) | HW sequencer process time(2) | Flash memory access time(2) |

FIG. 7C

| Host access time | HW sequencer process time(1) | Flash memory access time(1) | HW sequencer process time(2) | Flash memory access time(2) |

FIG. 7D

| Host access time | CPU access time(1) | Flash memory access time(1) | CPU access time(2) | Flash memory access time(2) |

CONTROLLER WHICH CONTROLS OPERATION OF NONVOLATILE SEMICONDUCTOR MEMORY AND SEMICONDUCTOR MEMORY DEVICE INCLUDING NONVOLATILE SEMICONDUCTOR MEMORY AND CONTROLLER THEREFORE

CROSS-REFERENCE TO RELATED APPLICATIONS

This application is based upon and claims the benefit of priority from prior Japanese Patent Application No. 2009-070582, filed Mar. 23, 2009, the entire contents of which are incorporated herein by reference.

BACKGROUND OF THE INVENTION

1. Field of the Invention

The present invention relates to a controller which controls an operation of a nonvolatile semiconductor memory device and a semiconductor memory system including a nonvolatile semiconductor memory and a controller therefore, for example, a controller which controls an operation of a flash memory device and a semiconductor memory system including a flash memory and a controller therefore.

2. Description of the Related Art

An example of a conventional operation for a semiconductor memory system including a semiconductor memory device, such as flash memory and a controller which controls the flash memory will be described below. This semiconductor memory system is connectable to a host device or soldered on a circuit board of the host device. The host apparatus transmits a command and data to the semiconductor memory device and exchanges data with the semiconductor memory device. As the host apparatus, for example, mobile electronic devices such as a digital camera, a mobile phone, and a personal computer are known.

When the host apparatus issues a command to the controller, the command is temporarily stored in a command latch circuit in the controller. Subsequently, a CPU (central processing unit) in the controller reads the command to set a sequence required to access the flash memory in a plurality of registers in the controller. Furthermore, the CPU sets valid bit registers corresponding to the plurality of registers and sets the in-use/not-in-use of a data RAM in the controller.

Upon completion of all the settings, a direct memory access (to be referred to as DMA hereinafter) start is executed, and access to the flash memory is started. At the end of the access, the CPU is notified of the end of access. Subsequently, when the flash memory is accessed, the plurality of registers and the valid bit registers are reset. Upon completion of setting of all the registers, the DMA start is executed, and the next access to the flash memory is started. The DMA means a process in which an apparatus such as the host apparatus and the memory device directly exchange data without using the CPU.

Upon completion of the sequence required for the flash memory, the CPU returns a ready signal to the host apparatus side, and is set in a standby state to wait for an input of a next command. Thereafter, when the next command is issued from the host apparatus, the controller repeats the same operation as described above.

In the conventional method described above, the CPU must set the registers in accordance with various command sequences to be issued to the flash memory. In response to one command request from the host apparatus, an access to the flash memory frequently requires a plurality of sequences. Each time the flash memory is accessed, the CPU requires a time to set the registers. As a result, an occupancy time of the CPU is dominant, and access performance to the flash memory becomes poor, disadvantageously. In particular, a time from when the host apparatus begins to access the controller, that is, when a command is input to the controller to when an access to the flash memory is actually ended becomes long, disadvantageously. FIG. 7D shows access times of parts in a conventional semiconductor memory device.

For example, Jpn. Pat. Appln. KOKAI Publication No. 2003-141888 discloses a nonvolatile semiconductor memory device including a plurality of registers which set pieces of information required to access a memory cell array and a sequencer which accesses the memory cell array on the basis of the information set in the registers.

BRIEF SUMMARY OF THE INVENTION

According to a first aspect of the present invention, there is provided a controller comprising: an instruction table memory in which an instruction code obtained by coding a sequence to access a nonvolatile semiconductor memory is stored; a program counter to which a read address in the instruction table memory to access the nonvolatile semiconductor memory is set; a first decoder which decodes the instruction code read from the instruction table memory to output a first decode signal; and a first executing unit which executes access to the nonvolatile semiconductor memory on the basis of the first decode signal output from the first decoder.

According to a second aspect of the present invention, there is provided a controller comprising: a register in which information to access a nonvolatile semiconductor memory is stored; a decoder which decodes a command externally input to output a decode signal; an executing unit which sets the information to access the nonvolatile semiconductor memory to the register on the basis of the decode signal output from the decoder; and an input/output control circuit which accesses the nonvolatile semiconductor memory according to the information stored in the register.

According to a third aspect of the present invention, there is provided a semiconductor memory device comprising: a nonvolatile semiconductor memory in which data can be electrically rewritten; and a controller which controls an operation of the nonvolatile semiconductor memory. The controller includes: an instruction table memory in which an instruction code obtained by coding a sequence to access a nonvolatile semiconductor memory is stored; a program counter to which a read address in the instruction table memory to access the nonvolatile semiconductor memory is set; a decoder which decodes the instruction code read from the instruction table memory to output a decode signal; and an executing unit which executes access to the nonvolatile semiconductor memory on the basis of the decode signal output from the decoder.

BRIEF DESCRIPTION OF THE SEVERAL VIEWS OF THE DRAWING

FIG. 1 is a block diagram showing a configuration of a semiconductor memory device according to a first embodiment of the present invention;

FIG. 3 is a block diagram showing a configuration of a semiconductor memory device according to a second embodiment of the present invention;

FIG. 4 is a flowchart showing an operation of the semiconductor memory device according to the second embodiment;

FIG. 5 is a block diagram showing a configuration of a semiconductor memory device according to a third embodiment of the present invention;

FIG. 6 is a flowchart showing an operation of the semiconductor memory device according to the third embodiment; and FIGS. 7A to 7D are diagrams showing access times in the semiconductor memory devices according to the embodiments of the present invention and a conventional semiconductor memory device.

DETAILED DESCRIPTION OF THE INVENTION

Figure 2:
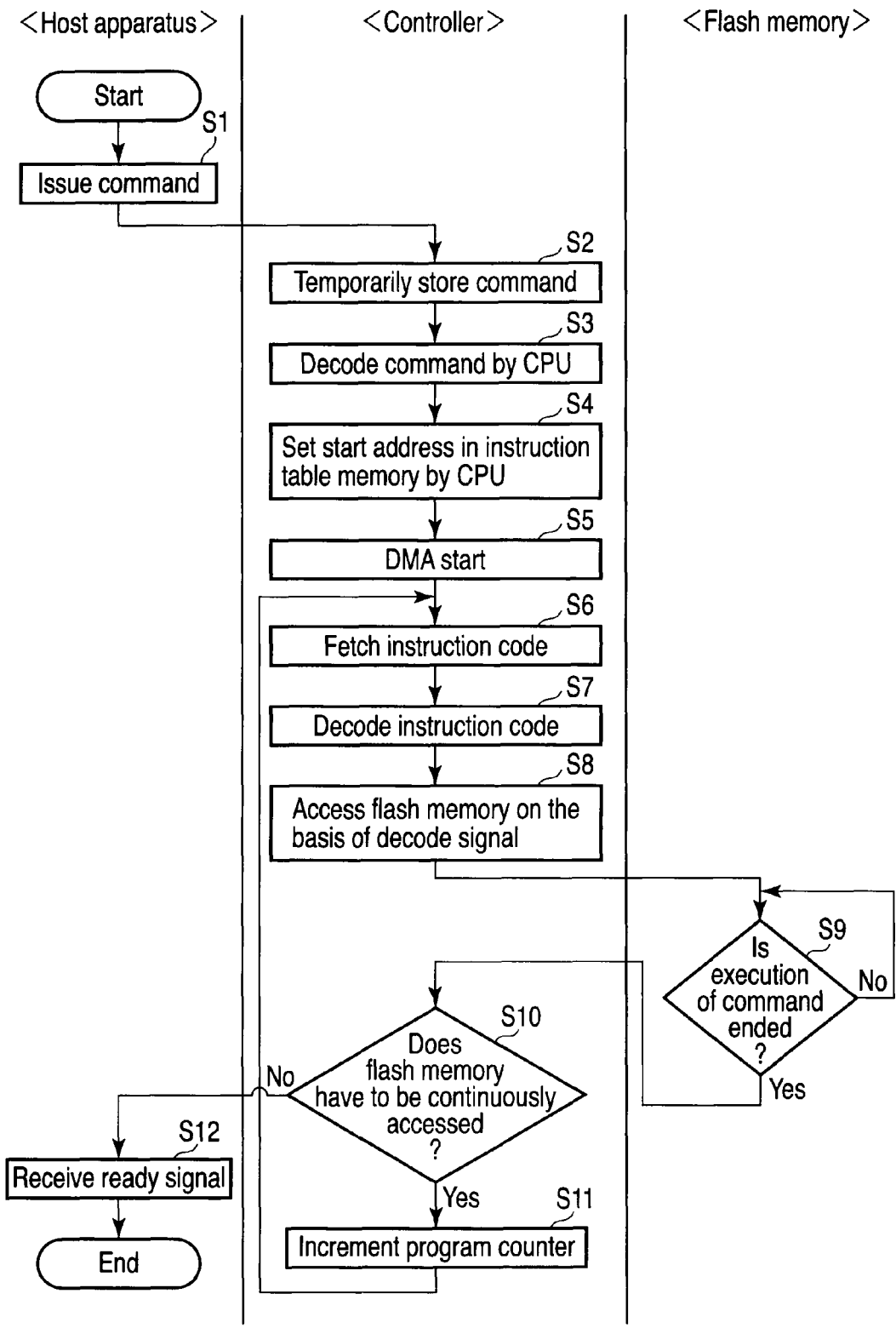
FIG. 2 is a flowchart showing an operation of the semiconductor memory device according to the first embodiment.

Embodiments of the present invention will be described below with reference to the accompanying drawings. The embodiments describe semiconductor memory devices all of which include controllers. In all the drawings, the same reference symbols denote the same parts, respectively.

[First Embodiment]

A semiconductor memory device according to a first embodiment of the present invention will be described below.

FIG. 1 is a block diagram showing a configuration of the semiconductor memory device according to the first embodiment.

As shown in FIG. 1, a semiconductor memory device 100 includes a nonvolatile semiconductor memory in which data can be electrically rewritten, such as a flash memory 10, and a controller 20. In this case, as the nonvolatile semiconductor memory, the flash memory 10 is exemplified. However, another nonvolatile semiconductor memory may be used. As the flash memory 10, for example, a NAND flash memory, a NOR flash memory, or the like can be used. The controller 20 receives a signal such as a command or data from the host apparatus 200 to control the operation of the flash memory 10.

The controller 20 includes a command latch circuit 21, a program counter (PC) 22, an instruction table memory 23, a decoder 24, an executing unit 25, an input/output control circuit 26, a data RAM 27, a CPU 28, and a bus 29.

The command latch circuit 21 temporarily stores a signal such as a command or data output from the host apparatus 200. In the instruction table memory 23, instruction codes obtained by coding various sequences to access the flash memory 10 are stored in advance. Coding of the various sequences is that, for example, in response to one write command from the host apparatus 200, when the flash memory 10 requires one series of commands, that is, erase command→status read command→write command→status read command, the series of commands are coded as one sequence. When an instruction code generated by the coding is merely set, one series of commands to the flash memory 10 can be continuously executed.

In the program counter 22, a start address in the instruction table memory 23, at which an instruction code required to access the flash memory 10 is set, is set.

The decoder 24 decodes the instruction code read from the instruction table memory 23 such that the instruction code can be executed by the executing unit 25 to output a decode signal. The executing unit 25 receives the decode signal from the decoder 24, recognizes a command on the basis of the decode signal, and controls the input/output control circuit 26.

The input/output control circuit 26 executes access to the flash memory 10 under the control of the executing unit 25, that is, writing, erasing, and reading. The CPU 28 controls operations of the parts in the controller 20. The bus 29 is a common transmission path which connects the CPU 28 and the parts in the controller 20 to each other and the parts in the controller 20 to each other.

An operation of the semiconductor memory device according to the first embodiment will be described below.

FIG. 2 is a flowchart showing the operation of the semiconductor memory device according to the first embodiment.

First, when a command is issued from the host apparatus 200 to the controller 20 in the semiconductor memory device 100 (step S1), the command is temporarily stored in the command latch circuit 21 (step S2).

The CPU 28 reads the command stored in the command latch circuit 21 and decodes the command (step S3). Subsequently, the CPU 28 sets a start address in the instruction table memory 23 to the program counter 22 on the basis of a decode result of the command (step S4). In the instruction table memory 23, an instruction code obtained by coding all necessary commands issued to the flash memory 10 is stored. The start address designates a storage position in which an instruction code required to access the flash memory 10 is set.

Subsequently, the CPU 28 executes DMA start (step S5). In this manner, the process of the CPU 28 ends.

The decoder 24 fetches an instruction code from the instruction table memory 23 (step S6). The instruction code is decoded by the decoder 24 to output a decode signal to the executing unit 25 (step S7).

Subsequently, the executing unit 25 receives the decode signal from the decoder 24, recognizes a command on the basis of the decode signal, and controls the input/output control circuit 26. Access to the flash memory 10 is executed by the input/output control circuit 26 (step S8). More specifically, a desired command sequence is issued to the flash memory 10.

In this manner, in the flash memory 10, the command is executed (step S9). When the execution of the command is ended, the operation shifts to step S10 in the controller 20.

In step S10, when the flash memory 10 must be continuously accessed (Yes in step S10), the address set to the program counter 22 is incremented (step S11).

Subsequently, the operation returns to step S6, and processes subsequent to step S6 are repeated. More specifically, on the basis of the address set to the program counter 22, the decoder 24 fetches an instruction code from the instruction table memory 23. Thereafter, as in the above description, the decoder 24 decodes the instruction code (step S7), and access to the flash memory 10 is executed by the executing unit 25 and the input/output control circuit 26 (step S8). In this manner, the access to the flash memory 10 can be repeatedly executed without causing the CPU 28 to perform a process.

Even though an output from the data RAM 27 is necessary, when an instruction code dedicated to the output is stored in the instruction table memory 23 in advance, the output from the data RAM 27 can be executed without the process by the CPU 28.

When the flash memory 10 need not be continuously accessed (No in step S10), that is, when a necessary sequence to the flash memory 10 is completed, a ready signal is transmitted to the host apparatus 200 side, and the host apparatus 200 receives the ready signal (step S12). The controller 20 is set in a standby state to wait for the next command input. When the next command is issued from the host apparatus 200, the controller 20 repeats the same operations as described above.

In the first embodiment, various sequences to access the flash memory 10 are coded. An instruction code set in accordance with the coded sequence is prepared in the instruction table memory 23 in advance. In this manner, when the start address stored in the program counter 22 is merely updated each time access sequences to the flash memory 10 change, the access to the flash memory 10 can flexibly cope with the access sequences. Depending on circumstances, the contents of the instruction table memory 23 can be changed, that is, instruction codes in the instruction table memory 23 can be updated. Instruction codes obtained by coding the various sequences to access the flash memory 10 and instruction codes to continuously access the instruction codes in an arbitrary order may be stored in the instruction table memory 23 in advance.

With the above processes, after a command is input to the controller 20, an occupancy time of the CPU 28 can be considerably reduced, and accessibility to the flash memory 10 can be outstandingly improved. FIG. 7A shows an access time in the semiconductor memory device 100 according to the first embodiment. As is apparent from this drawing, a process time (CPU access time) taken by the CPU 28 after an access time (host access time) to the controller 20 by the host apparatus 200 can be shortened. Furthermore, a CPU access time after an access time (flash memory access time) (1) to the flash memory 10 by the controller 20 and before the flash memory access time (2) can be eliminated. For this reason, accessibility to the flash memory can be remarkably improved. In this case, the CPU access time means a time required, after the CPU 28 decodes a command, until a start address is set to the program counter 22 on the basis of the decode result.

In particular, a time until access to the flash memory 10 is actually ended after the host apparatus 200 begins to access the controller 20, that is, after a command is input to the controller 20 can be shortened. In this case, since the CPU need not perform a process before the second access to the flash memory, an access time required when the flash memory is continuously accessed can be considerably shortened. As described above, a time required to write, erase, and read data in the semiconductor memory device according to the first embodiment can be reduced.

[Second Embodiment]

A semiconductor memory device according to a second embodiment of the present invention will be described below.

FIG. 3 is a block diagram showing a configuration of the semiconductor memory device according to the second embodiment. The second embodiment is configured such that the configuration of the first embodiment shown in FIG. 1 further includes a decoder 30 and an executing unit 31 to set a start address to the program counter 22 on the basis of a command stored in the command latch circuit 21. The other configuration is the same as the corresponding configuration of the first embodiment.

As shown in FIG. 3, the decoder 30 and the executing unit 31 are arranged between the command latch circuit 21 and the bus 29. A dedicated line 32 is connected between the executing unit 31 and the program counter 22 and the instruction table memory 23.

The decoder 30 decodes a command stored in the command latch circuit 21 and outputs a decode signal such that the executing unit 31 can set a start address in the instruction table memory 23 to the program counter 22. The executing unit 31 receives the decode signal from the decoder 30 and sets the start address in the instruction table memory 23, in which an instruction code required to access the flash memory 10 is stored, to the program counter 22 on the basis of the decode signal.

The setting of the start address to the program counter 22 may be performed by using the bus 29 or may be performed by using the dedicated line 32 which connects the executing unit 31 and the program counter 22 to each other. When the dedicated line 32 is used to set the start address, the bus 29 is in an idle state. For this reason, transmission of another signal by using the bus 29 can be performed in parallel to signal transmission performed to set the start address by using the dedicated line 32.

An operation in the second embodiment is as follows.

FIG. 4 is a flowchart showing an operation of the semiconductor memory device according to the second embodiment.

When a command is issued from the host apparatus 200 (step S1), the command is temporarily stored in the command latch circuit 21 (step S2). The command stored in the command latch circuit 21 is decoded by the decoder 30 (step S13) and output to the execution unit 31 as a decode signal. Subsequently, on the basis of the decode signal, a start address, at which an instruction code required to access the flash memory 10 is set, is set to the program counter 22 by the executing unit 31 (step S14). The subsequent operation is the same as the operation in the first embodiment described above.

According to the second embodiment, access to the flash memory 10 can be executed by only a hardware sequencer without passing through the CPU 28, that is, without the operation by the CPU 28. In this case, the hardware sequencer means control performed by the decoder 30, the executing unit 31, the program counter 22, the instruction table memory 23, the decoder 24, the executing unit 25, the input/output control circuit 26, or the like. In this manner, the process time taken by the CPU 28 can be reduced, and accessibility to the flash memory 10 can be improved.

FIG. 7B shows an access time in the semiconductor memory device 100 according to the second embodiment. As is apparent from this drawing, a CPU access time after the host access time can be eliminated, and the access time in the semiconductor memory device 100 consists of only a process time (HW sequencer process time) (1) taken by the hardware sequencer. Furthermore, the CPU access time after the flash memory access time (1) and before the flash memory access time (2) can be eliminated, and only an HW sequencer process time (2) is taken. In this manner, accessibility to the flash memory can be remarkably improved.

In particular, a time from when the host apparatus 200 begins to access the controller 20, that is, when a command is input to the controller 20 to when the access to the flash memory 10 is actually ended can be shortened. In this case, before any one of the first access to the flash memory or the second access to the flash memory, the process by the CPU is not necessary. For this reason, an access time taken when the flash memory is continuously accessed can be considerably shortened. In this manner, times required to write, erase, and read data in the semiconductor memory device according to the second embodiment can be reduced.

[Third Embodiment]

A semiconductor memory device according to a third embodiment of the present invention will be described below.

FIG. 5 is a block diagram showing a configuration of the semiconductor memory device according to the third embodiment. The third embodiment is configured such that, in place of the instruction table memory 23, the program counter 22, the decoder 24, and the executing unit 25 in the configuration of the second embodiment shown in FIG. 3, various registers are arranged. The other configuration of the third embodiment is the same as the corresponding configuration of the second embodiment.

As shown in FIG. 5, a first register 34, a second register 35, ..., an Nth register 36, and a valid bit register 37 are arranged between the bus 29 and the input/output control circuit 26. Pieces of information required to access the flash memory 10 are stored in the first to Nth registers, respectively. In the valid bit register 37, pieces of information corresponding to the first to Nth registers are stored. The first to Nth registers indicate various setting registers such as a command register, an address register, and a status register.

Setting of the pieces of information to the first register 34, the second register 35, ..., the Nth register 36, and the valid bit register 37 may be performed by using the bus 29 or using a dedicated line 38 which connects an executing unit 33 and the registers to each other. When the dedicated line 38 is used in the information setting to the register, the bus 29 is in an idle state. For this reason, in parallel to signal transmission for information setting to the register by using the dedicated line 38, another signal transmission using the bus 29 can be performed.

An operation in the third embodiment will be described below.

FIG. 6 is a flowchart showing an operation of a semiconductor memory device according to the third embodiment.

When a command is issued from the host apparatus 200 (step S1), the command is temporarily stored in the command latch circuit 21 (step S2). The command stored in the command latch circuit 21 is decoded by the decoder 30 (step S23) and output to the executing unit 33 as a decode signal.

Subsequently, on the basis of the decode signal, the executing unit 33 sets sequences required to access the flash memory 10 to the first register 34, the second register 35, ..., the Nth register 36, respectively, and the valid bit registers 37 corresponding to the registers are set (step S24).

The in-use/not-in-use of the data RAM 27 is also set. Upon completion of all the settings, DMA start is executed (step S5), and access to the flash memory 10 is executed by the input/output control circuit 26 on the basis of the information set in the registers (step S25). More specifically, a desired command sequence is issued to the flash memory 10.

In this manner, the flash memory 10 executes the command (step S9). When the execution of the command is ended, the operation shifts to step S10 in the controller 20.

In step S10, when the flash memory 10 must be continuously accessed (Yes in step S10), the executing unit 33 resets sequences (information) required to access the flash memory 10 to the first register 34, the second register 35, ..., the Nth register 36, and the valid bit register 37, respectively (step S26).

Subsequently, the operation returns to step S5, and processes subsequent to step S5 are repeated. More specifically, DMA start is executed (step S5), and access to the flash memory 10 is executed by the input/output control circuit 26 on the basis of the information set in the register (step S25).

When the flash memory 10 need not be continuously accessed (No in step S10), that is, when the sequence required to access the flash memory 10 is completed, the CPU 28 transmits a ready signal to the host apparatus 200 side, and the host apparatus 200 receives the ready signal (step S12). The controller 20 is set in a standby state to wait for the next command input. When the next command is issued from the host apparatus 200, the controller 20 repeats the same operations as described above.

According to the third embodiment, access to the flash memory 10 can be executed by only a hardware sequencer without passing through the CPU 28, that is, without the process by the CPU 28. In this case, the hardware sequencer means control performed by the decoder 30, the executing unit 33, the first register 34, the second register 35, ..., the Nth register 36, the valid bit register 37, and the input/output control circuit 26. In this manner, the process time taken by the CPU 28 can be reduced, and accessibility to the flash memory 10 can be improved.

FIG. 7C shows an access time in the semiconductor memory device 100 according to the third embodiment. As is apparent from this drawing, a CPU access time after the host access time can be reduced, and the access time in the semiconductor memory device 100 is configured by only an HW sequencer process time (1). Furthermore, the CPU access time after the flash memory access time (1) and before the flash memory access time (2) can be eliminated, and only an HW sequencer process time (2) is required. In this manner, accessibility to the flash memory can be remarkably improved.

In particular, a time from when the host apparatus 200 begins to access the controller 20, that is, when a command is input to the controller 20 to when the access to the flash memory 10 is actually ended can be shortened. In this case, before any one of the first access to the flash memory or the second access to the flash memory, the process by the CPU is not necessary. For this reason, an access time taken when the flash memory is continuously accessed can be considerably shortened. In this manner, times required to write, erase, and read data in the semiconductor memory device according to the third embodiment can be reduced.

The instruction table memory 23 described in the embodiment has, besides the instruction codes required for command issue to the flash memory 10, the following instruction codes to solve the problems of the present invention.

(a) An instruction code to continuously execute different sequences of several types in an arbitrary order without passing through the CPU when a jump instruction is used.

Example 1) sequence A→sequence B→sequence C
Example 2) sequence B→sequence A→sequence C (b) An instruction code to repeat different sequences of several types arbitrary number of times when a loop instruction is used.

Example 1) sequence A→sequence B→sequence A→sequence B→sequence A→ ...

The instruction table memory 23 has the instruction codes described in items (a) and (b) to make it possible to change the contents in the instruction table memory 23 into the above contents according to circumstances and to make it possible to flexibly cope with various cases.

The conclusion of the effects obtained by the embodiments of the present invention is as follows.

(1) Accessibility to a flash memory can be improved. In particular, a time from when a host apparatus begins to access a controller, that is, when a command is input to the controller, to when the access to the flash memory is actually ended can be shortened.

(2) When an instruction code stored in an instruction table memory is rewritten, the controller or the semiconductor memory device can flexibly cope with various sequences according to sequences required to access the flash memory.

(3) When a process conventionally performed by a CPU is performed by hardware (hardware sequencer), a process time of the CPU can be reduced or eliminated. In this manner, the CPU can perform other processes.

(4) Since the process time taken by the CPU can be reduced or eliminated, a power consumption in the controller can be reduced.

Each of the embodiments of the present invention provides a controller and a semiconductor memory device which can reduce a process by a CPU required to access a nonvolatile semiconductor memory and which shorten a time from when a command is input to when the access to the nonvolatile semiconductor memory is ended.

The embodiments of the present invention can be widely applied to a mobile memory device including, for example, memory cards such as an SD memory card or an MMC (multimedia card), and a memory control system which controls the memory device.

The embodiments described above can be not only independently executed but also arbitrarily executed in combination with each other. The embodiments described above include inventions at various levels. When a plurality of constituent elements disclosed in the embodiments are arbitrarily combined to each other, inventions at various levels can also be extracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller comprising:
   an instruction table memory in which a first instruction code obtained by coding a sequence to access a nonvolatile semiconductor memory is stored;
   a program counter to which a read address in the instruction table memory to access the nonvolatile semiconductor memory is set;
   a first decoder which decodes the first instruction code read from the instruction table memory to output a first decode signal; and
   a first executing unit which executes access to the nonvolatile semiconductor memory on the basis of the first decode signal output from the first decoder, wherein
   the sequence to access the nonvolatile semiconductor memory includes a sequence of a plurality of commands to be sent to the nonvolatile semiconductor memory,
   the instruction table memory stores a second instruction code and a plurality of instruction codes,
   the first instruction code is included in the plurality of instruction codes,
   each of the plurality of instruction codes is obtained by coding sequences to access the nonvolatile semiconductor memory, and
   the second instruction code continuously accesses the plurality of instruction codes in an arbitrary order.

2. The controller according to claim 1, further comprising:
   a command latch circuit in which a command externally input is stored; and
   a CPU which decodes the command stored in the command latch circuit and sets the read address in the instruction table memory to the program counter on the basis of a result decoded by the CPU.

3. The controller according to claim 2, wherein, when the nonvolatile semiconductor memory is continuously accessed, the address set to the program counter is incremented.

4. The controller according to claim 1, further comprising:
   a second decoder which decodes a command externally input to output a second decode signal; and
   a second executing unit which sets the read address to the program counter on the basis of the second decode signal output from the second decoder.

5. The controller according to claim 4, wherein a dedicated line to set the read address to the program counter is arranged between the second executing unit and the program counter.

6. The controller according to claim 4, further comprising:
   a command latch circuit in which the command externally input is stored,
   wherein the command stored in the command latch circuit is decoded by the second decoder.

7. The controller according to claim 4, wherein when the nonvolatile semiconductor memory is continuously accessed, the address set to the program counter is incremented.

8. A semiconductor memory device comprising:
   a nonvolatile semiconductor memory in which data can be electrically rewritten; and
   a controller which controls an operation of the nonvolatile semiconductor memory,
   wherein the controller includes:
   an instruction table memory in which a first instruction code obtained by coding a sequence to access a nonvolatile semiconductor memory is stored;
   a program counter to which a read address in the instruction table memory to access the nonvolatile semiconductor memory is set;
   a decoder which decodes the first instruction code read from the instruction table memory to output a decode signal; and
   an executing unit which executes access to the nonvolatile semiconductor memory on the basis of the decode signal output from the decoder, wherein
   the sequence to access the nonvolatile semiconductor memory includes a sequence of a plurality of commands to be sent to the nonvolatile semiconductor memory,
   the instruction table memory stores a second instruction code and a plurality of instruction codes,
   the first instruction code is included in the plurality of instruction codes, each of the plurality of instruction codes is obtained by coding sequences to access the nonvolatile semiconductor memory, and
   the second instruction code continuously accesses the instruction codes in an arbitrary order.

9. The semiconductor memory device according to claim 8, further comprising:
   a command latch circuit in which a command externally input is stored; and
   a CPU which decodes the command stored in the command latch circuit and sets the read address in the instruction table memory to the program counter on the basis of a result decoded by the CPU.

10. The semiconductor memory device according to claim 9, wherein when the nonvolatile semiconductor memory is continuously accessed, the address set to the program counter is incremented.

* * * * *